(12) United States Patent
Jarecki

(10) Patent No.: US 7,758,299 B1
(45) Date of Patent: Jul. 20, 2010

(54) WIND TURBINE ASSEMBLY

(76) Inventor: Frank Jarecki, 5660 Culpepper Dr., Erie, PA (US) 16506

( * ) Notice: Subject to any disclaimer, the term of this patent is extended or adjusted under 35 U.S.C. 154(b) by 36 days.

(21) Appl. No.: 11/977,693

(22) Filed: Oct. 24, 2007

Related U.S. Application Data

(60) Provisional application No. 60/854,010, filed on Oct. 24, 2006.

(51) Int. Cl.
F03D 3/04 (2006.01)

(52) U.S. Cl. .......... 415/4.2; 415/4.4; 415/126; 415/130; 415/224; 416/111; 416/119; 416/132 B; 416/178; 416/187

(58) Field of Classification Search ........... 415/4.2, 415/4.4, 126, 130, 224; 416/111, 119, 187, 416/186 A, 178, 132 B; 290/44, 55
See application file for complete search history.

(56) References Cited

U.S. PATENT DOCUMENTS

| | | | | |
|---|---|---|---|---|
| 3,995,170 A | * | 11/1976 | Graybill | 290/55 |
| 4,052,134 A | * | 10/1977 | Rumsey | 416/119 |
| 4,132,282 A | * | 1/1979 | Sparks | 180/2.2 |
| 4,309,146 A | * | 1/1982 | Hein et al. | 415/4.4 |
| 4,457,666 A | * | 7/1984 | Selman, Jr. | 415/203 |
| 4,618,312 A | * | 10/1986 | Williams | 416/119 |
| 5,098,264 A | * | 3/1992 | Lew | 418/23 |
| 7,211,905 B1 | * | 5/2007 | McDavid, Jr. | 180/65.31 |
| 7,242,108 B1 | * | 7/2007 | Dablo | 290/55 |
| 7,319,279 B2 | * | 1/2008 | Korner | 290/55 |

* cited by examiner

Primary Examiner—Ninh H Nguyen
(74) Attorney, Agent, or Firm—Richard K. Thomson

(57) ABSTRACT

A wind turbine for generating electricity is configured as a drum with a housing that has adjustable shutters to control the amount of wind reaching the turbine blades. Alternatively, the turbine blades can be pivotably mounted and opened and closed using a cam follower, cam track system to minimize wind exposure to downstream turbine blades.

19 Claims, 14 Drawing Sheets

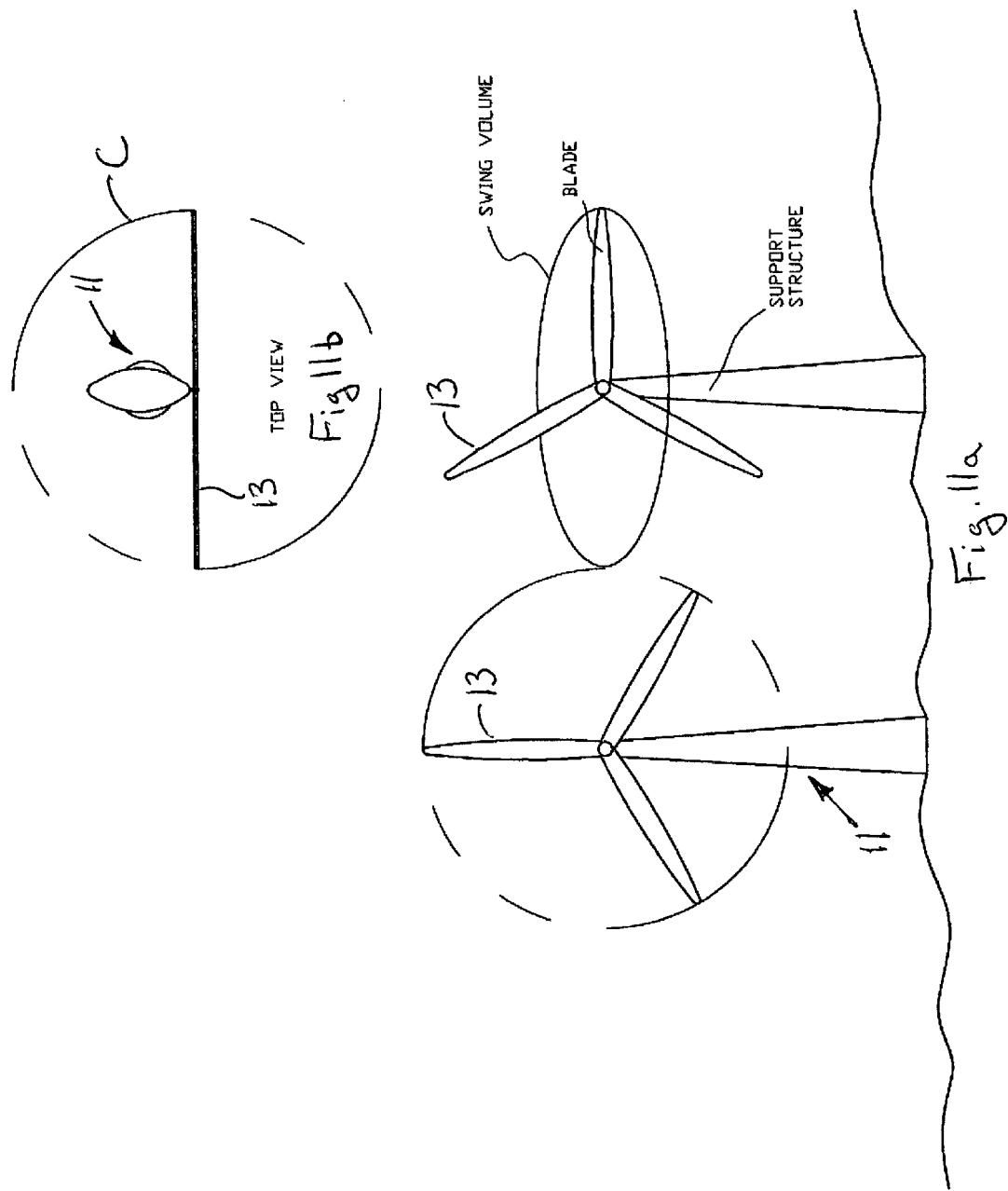

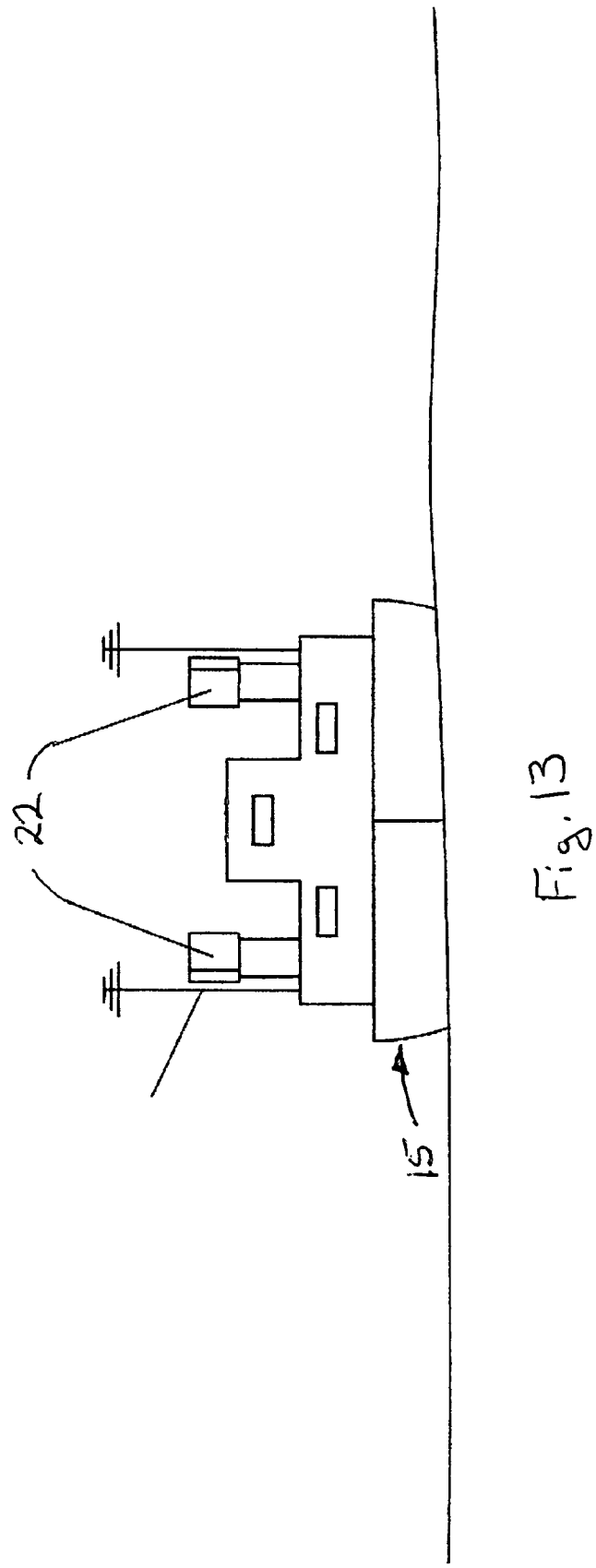

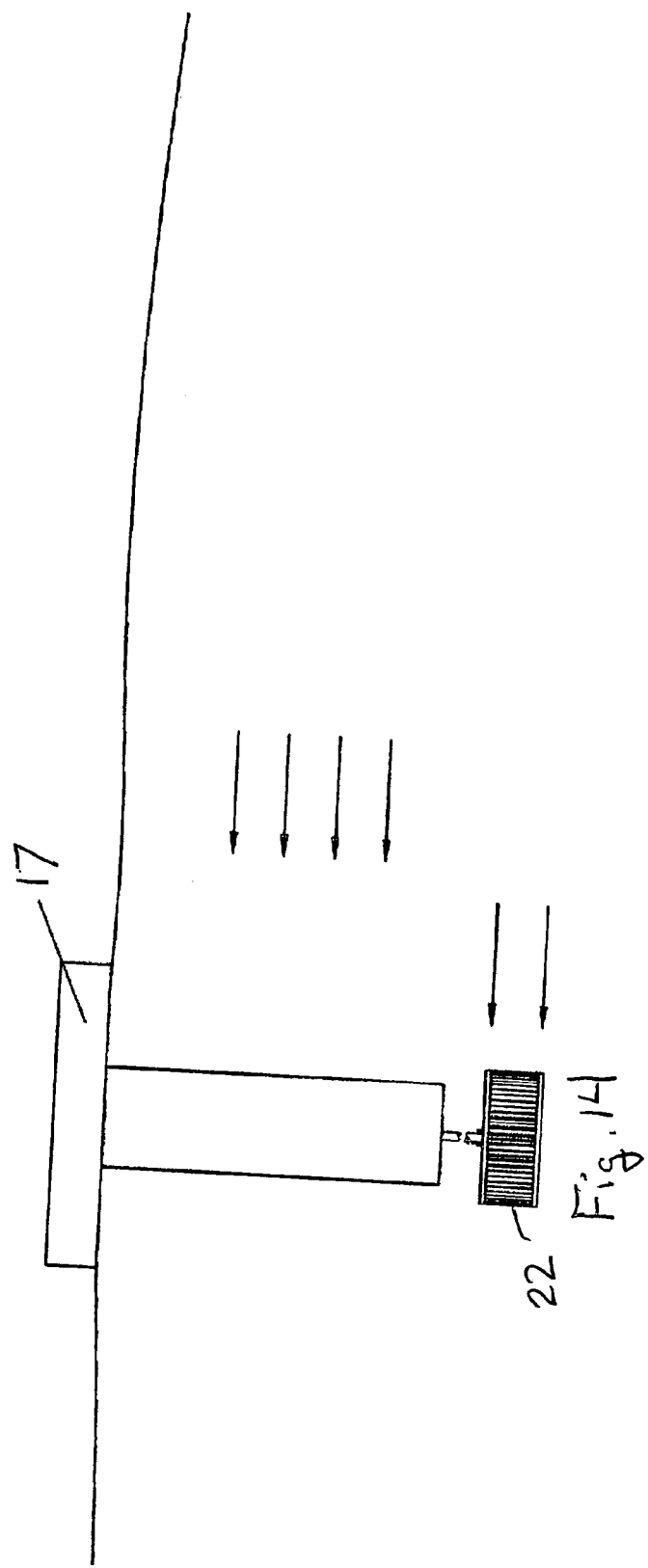

WIND TURBINE ASSEMBLY

This application claims the benefit of priority of Provisional Patent Appl. No. 60/854,010 filed Oct. 24, 2006.

BACKGROUND AND SUMMARY OF THE INVENTION

With the rising costs associated with finding, extracting and processing petroleum resources, and the ecological impact of utilizing such fuels (both real and imagined), the world is turning to alternative sources of energy. One particularly attractive source is wind. Wind is clean, economical, renewable/non-expendable and virtually available everywhere, albeit more routinely accessible in some regions than in others.

The wind-powered generators of the existing prior art tend to be large, bulky propeller-like apparatuses that of necessity must be pointed into the wind to function. This requires that a significant "footprint" be allotted to each generator, exceeding 250 feet in diameter, in some instances, as the blade rotates about its pedestal to catch the wind. In addition to being unsightly, inefficient usages of space, these propeller-like devices are a huge hazard to migratory birds. Because they slice such a huge swath through the air, unsuspecting flocks flying through/around a wind farm sporting a plurality of such devices lose a significant percentage of birds, cut down in the prime of their lives. It is estimated by some sources, based on growth rate of wind farms and current mortality rates, that between 900,000 and 1.8 million birds will lose their lives every year to these wind farms by the year 2030.

The wind generator of the present invention is significantly more efficient at capturing/converting wind energy to electricity as well as being more ecologically friendly. The wind generator of the present invention is a cylindrical turbine having pivoting vanes to increase/decrease profile on the upwind and downwind legs of the rotation. The present invention comprises a wind turbine for powering an electrical generator, the wind turbine including a) a first cylindrical drum member having a first footprint; b) a first ring at a first end of the cylindrical drum member; c) a second ring at a second opposite end of the cylindrical drum member; d) a plurality of turbine vanes extending between the first and second vanes, each of the plurality of turbine vanes have an arcuate surface for scooping the wind; e) a centrally located shaft which rotationally mounts the drum member for rotation about an axis; f) means for mounting said centrally located shaft enabling said cylindrical drum member to rotate about its longitudinal axis. In one preferred embodiment, the means mounting said drum comprises a tower which has a second footprint smaller than the first footprint of the cylindrical drum member. In this first embodiment, the shaft rotationally mounting the cylindrical drum member extends vertically and the cylindrical drum member rotates about a vertical axis.

The vanes are pivotally mounted to the first and second ring to enable them to maximize a surface exposure to wind facilitating rotation of the cylindrical drum member while minimizing surface exposure to wind opposing that rotation. Preferably, a housing surrounds the cylindrical drum member, and shutter means controls exposure of the turbine vanes to the wind, the shutter means being movably mounted on the housing, and mechanical means are provided to open and close the shutter means. In one embodiment, a low pressure outlet is positioned in the housing above the cylindrical drum member. It is feasible, and in some cases, desirable, to mount a second cylindrical drum member on the tower at a position below the first cylindrical drum member. In an alternate embodiment, the shall rotationally mounting the cylindrical drum member extends horizontally and the cylindrical drum member rotates about a horizontal axis. Applications in which the turbine of the present invention has applicability include cruise/cargo ships, offshore platforms, small aircraft for emergency power requirements, in addition to the conventional wind power farms.

The wind turbine of the present invention is most preferably mounted above the ground to position it above trees, buildings and other obstructions. In designing the turbine assembly, the desired level of useful work will be considered in sizing the assembly. The amount of working torque produced by each blade is a function of a) the area of the turbine blade exposed to normal wind velocity, b) location of the center of pressure of the turbine blade, c) the working coefficient of drag on the blade, and d) the distance the center of pressure is located from the center of rotation (i.e., the length of the moment arm). The work produced by the assembly will then be the sum of the work produced by each of the individual blades exposed to the relative wind velocity. It will be apparent that the closer the centers of pressure are to the peripheral surface of the cylindrical drum mounting them (i.e., the longer the moment arm), the greater the amount of useful work which can be extracted from the wind by each blade.

From the study of fluid dynamics, it is known that a fluid flowing against and around an orthogonally positioned object will be compressed increasing the fluid pressure, and then the fluid will accelerate around the impinging structure. As the wind flows around the cylindrical obstruction of the wind turbine of the present invention, the pressure increase occurs on the windward (front) side of the turbine. As the pressurized wind then flows around the turbine, its velocity increases pushing the vanes with it. Subsequently, as the wind transfers its energy to the vanes, it will decelerate and eventually separate from the turbine blade on the downwind side thereof. The wind will flow equally around both sides of the turbine. Accordingly, the "back side" of the turbine will be housed by a deflector shield and the vanes will pivot to limit resistance to rotation of the turbine for improved efficiency.

The amount of work performed by any turbine assembly is governed by known mathematical equations which are used in designing and constructing a turbine assembly. The assembly will be sized to extract a desired amount of work when the ambient wind velocities are at their mean value and between 50-60% of the total working area of each blade is exposed to the wind.

The governing equations are $$F = V \times A \times N \times (1 - C_d)$$

where F equals the force produced by the wind,

V is the relative wind velocity,

N is the number of turbine blades exposed at any given time, and $C_d$ is the coefficient of drag for each blade.

$$T = F \times R$$

where T is the torque generated, and

R is the radial distance between the center of pressure of the blade and the axis of rotation.

$$W = T \times \theta$$

where W is the work done, and $\theta$ is the angle through which each blade rotates while engaged by the wind.

Finally the Power obtained, P=W/unit time.

In order to optimize performance, it is important that the exposure of the turbine blades be managed; that is, the vanes which are in optimal alignment with the wind direction will be exposed to the wind, while those that would resist rotation in that direction are blocked. This exposure management is accomplished by two facets of the present invention. First, the housing of the turbine assembly is equipped with shutters that can be adjusted between fully open and fully closed positions. Preferably, these shutters pivot about a horizontal axis and move upwardly and downwardly, although alternative configurations can be embodied without departing from the spirit of the invention. A limited number of shutters will be open and any given time; most preferably, the shutters which extend between a point just beyond the point of direct impact from the wind to a point 160° around the housing in the direction of the rotation of the turbine will be open to enable the turbine blades to catch the wind and convert its potential energy into actual work.

As previously mentioned, the turbine assembly will be sized to produce the needed power output to drive a generator, for example, under average wind conditions with the shutters 50% open. If wind velocity ebbs, the shutters can be opened wider to expose a greater length of each turbine blade. Conversely, when the wind velocity increases above the nominal average value, the shutters can be closed to reduce the turbine blade exposure. This control of rotational speed is needed to provide a substantially uniform rate of rotation. With a DC generator, this is needed to prevent physical overload of the generator or drive shafts. For an AC system, it is typical to operate at a constant alternator speed which will be accomplished by the use of variable speed motors in conjunction with the shutter system of the present invention. By managing turbine blade exposure using the shutter system of the present invention, the need for auxiliary equipment to turn the blades into the wind (as is the case for some prior art systems), is obviated. An alternative means of operating the shutters is to fully open them when the turbine blades are exposed to positive wind force and to fully close the shutters which would expose turbine blades to negative wind force. Obviously, this eliminates some of the control available with the preferred method. The ability of the shutters to fully close affords the turbine assembly the capability to shield the moving parts from gale force winds and other potential weather related damage.

Second, each of the turbine blades themselves pivot along their inner edge to provide maximum blade exposure to catch the wind on the upstream side of the device and to minimize the resistance to desired rotation by pivoting out of the way on the downstream side of the device. This maximizes the efficiency turbine assembly in converting the potential energy of the wind into useful power.

The wind turbine assembly of the present invention has a defined footprint of significantly smaller dimension than the propeller blade design currently being used. This affords it the opportunity to be mounted on high rise buildings, cruise ships, and offshore oil platforms, to name several applications for which the prior art systems are incapable of addressing. In addition, as depicted in one of the embodiments of the present invention, two or more turbine assemblies can be mounted on a single columnar supporting structure to enhance the use of space in any of these applications or on a "wind farm".

Various other features, advantages, and characteristics of the present invention will become apparent after a reading of the following detailed description.

BRIEF DESCRIPTION OF THE DRAWINGS

The preferred embodiment(s) of the present invention is/are described in conjunction with the associated drawings in which like features are indicated with like reference numerals and in which

FIG. 7A is a detailed top view depicting the pivoting of the vanes to a closed position;

FIG. 7B is a detailed top view depicting the pivoting of the vanes to an open position;

FIG. 10a is a schematic side view of a second embodiment of wind turbine tower;

FIG. 10b is a schematic rear view of the tower shown in FIG. 10a;

FIG. 11A is a schematic perspective view of the foot print of a conventional propeller-style wind turbine;

FIG. 11B is a top view of a conventional propeller-style wind turbine;

FIG. 13 is a schematic depiction of two of the turbines of the present invention aboard ship; and, FIG. 14 is schematic side view of fourth embodiment utilized in marine applications.

DETAILED DESCRIPTION OF THE PREFERRED EMBODIMENT(S)

Figure 1:
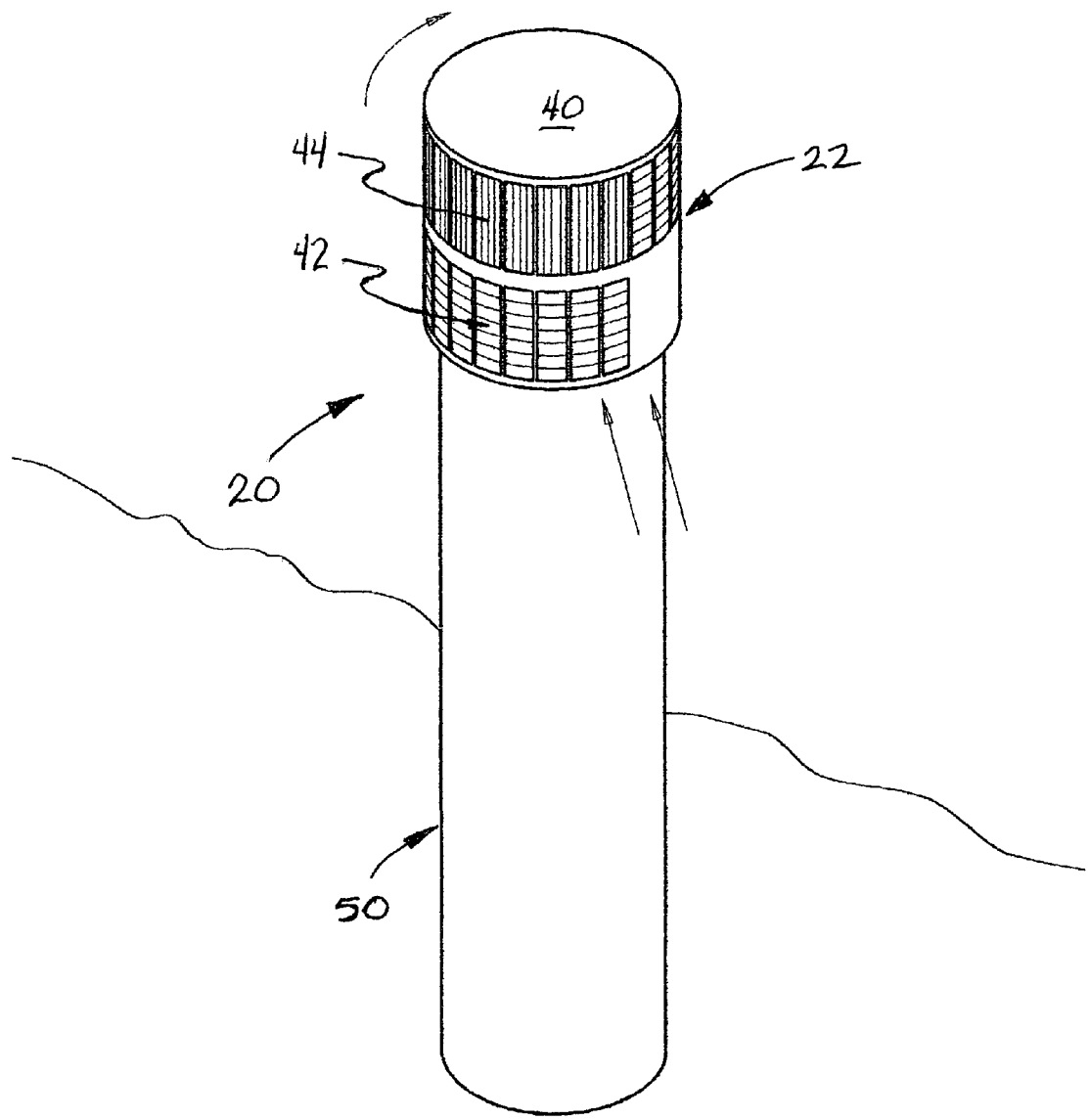
FIG. 1 is a perspective front view of a first embodiment of the wind turbine generator of the present invention.
Figure 7:
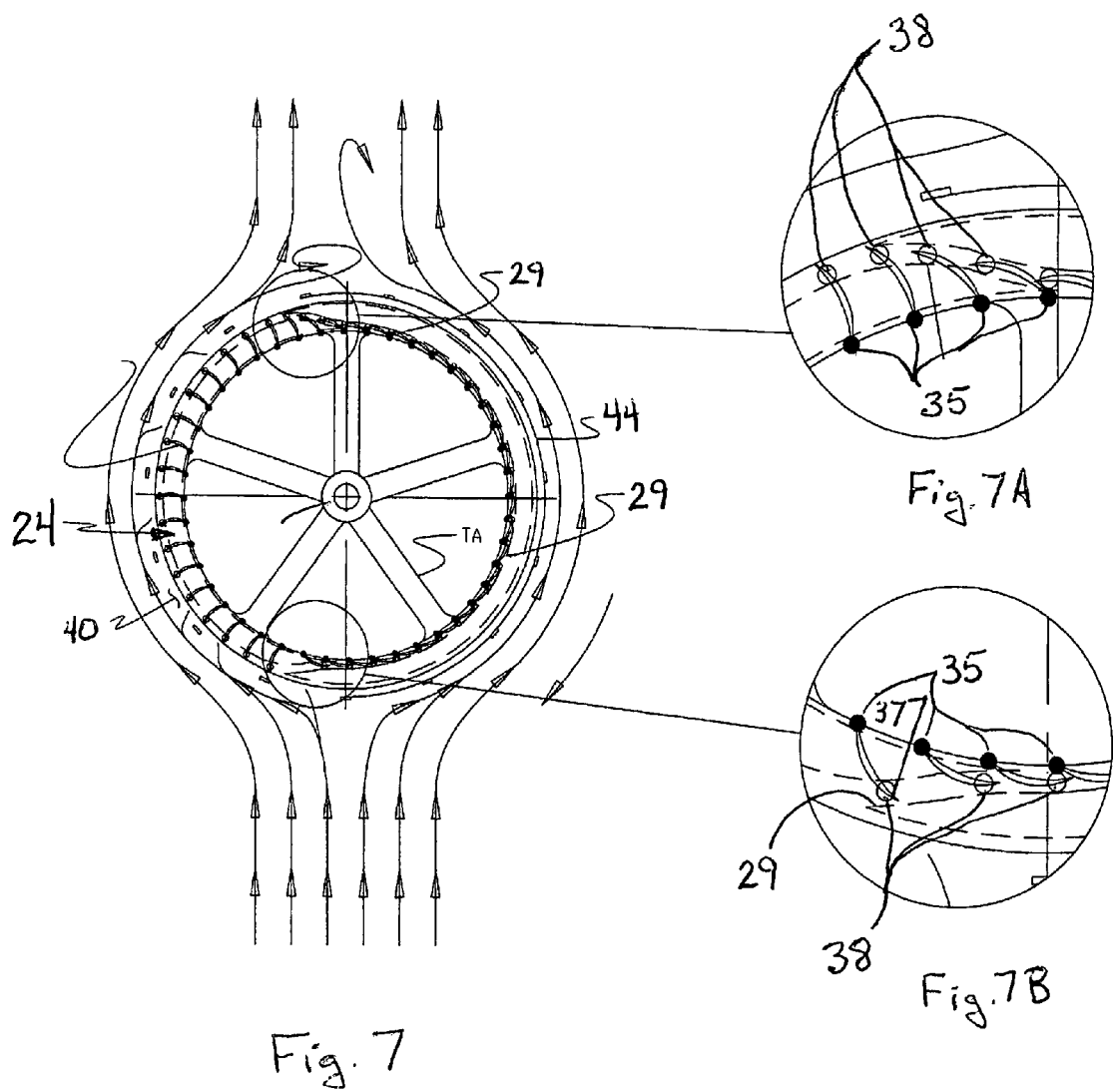
FIG. 7 is a schematic top view showing operation of the folding blades.
Figure 8:
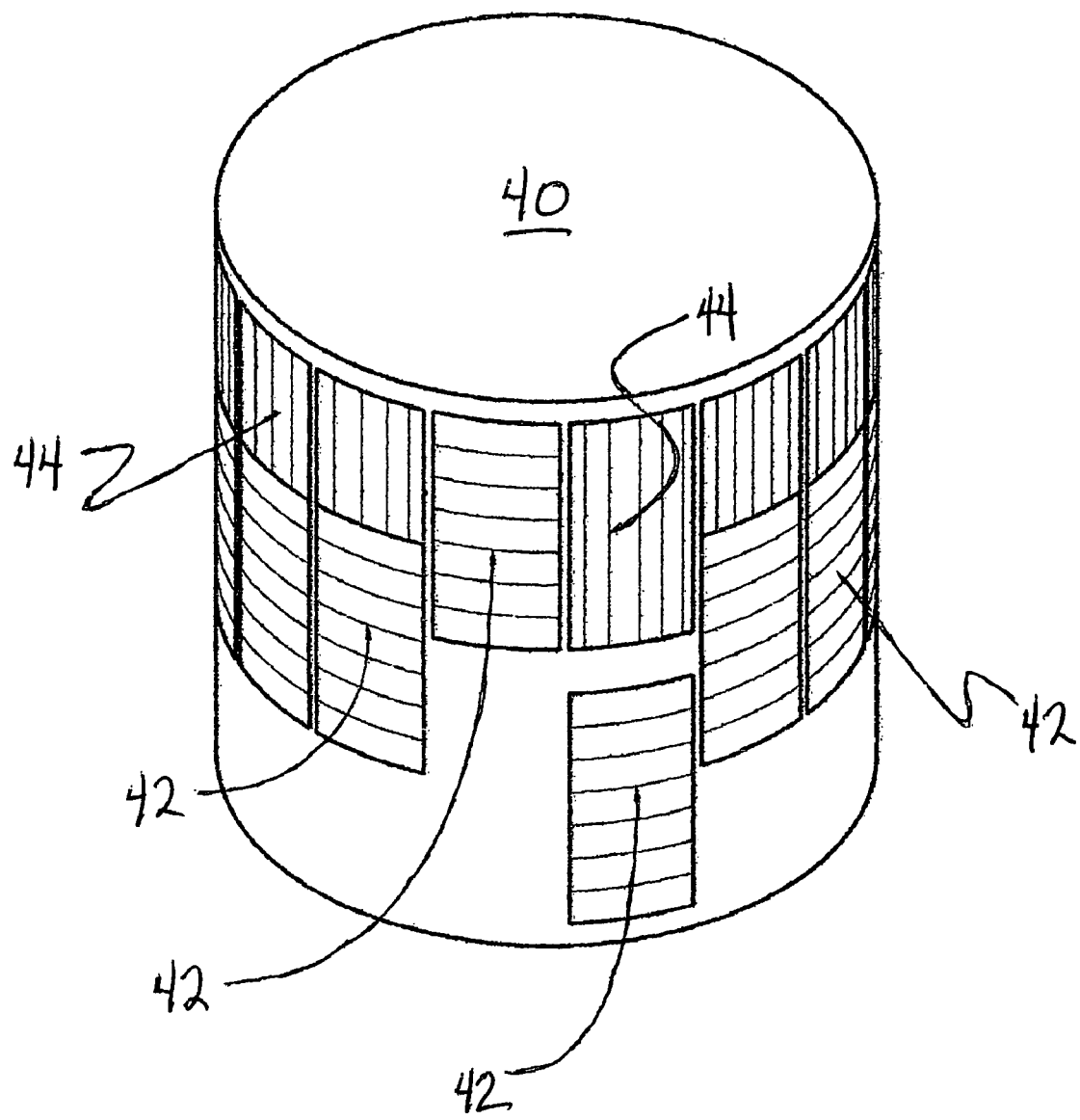
FIG. 8 is a detailed schematic perspective of the turbine enclosure depicted in FIG. 1.

A first embodiment of the wind turbine generator of the present invention is depicted in FIG. 1 generally at 20. Turbine generator 20 consists of a turbine assembly 22 having a first "footprint" with respect to ground coverage. Turbine assembly 22 is mounted on a support tower 50 which has a second footprint that is only slightly smaller than the first. This distinguishes turbine generator 20 from prior art propeller blade wind turbines whose footprint is dozens of times larger than the footprint of its tower. Turbine assembly 22 preferably rotates around a vertical axis making it significantly more "bird friendly" in that there is no downward chopping movement which catches avians unaware. Turbine assembly 22, as best seen in FIGS. 2-3A, 3B, 7, 7A and 7B, comprises a cylindrical drum 24 which has a first upper ring 26 on one end and second lower ring 28 at an opposite end of drum 24. A plurality of spokes 30 extend outwardly from central hub 32 to first ring 26. Hub 32 is connected via shaft 34 to a generator (not shown) to produce electric current. As seen in FIGS. 7, 7A, 7B, inner edge 35 of each vane 36 is pivoted at the top to first ring 26 and at the bottom to opposing ring 28 at a point adjacent its inner edge 35. A cam follower 38 attached to outer edge 37 of vane 36 rides in cam track 29 shown in FIG. 7A attached to second lower ring 28, although it will be appreciated that cam track 29 could just as well be attached to first upper ring 26. As seen in FIGS. 7, 7A and 7B, cam followers 38 riding in cam track 29 cause vanes 36 to pivot to a fully open position when in position to catch the wind thereby rotating drum 24, and to close (FIG. 7A) when the wind would hamper rotation of drum 24 (i.e., on the down-wind leg).

Figure 6:
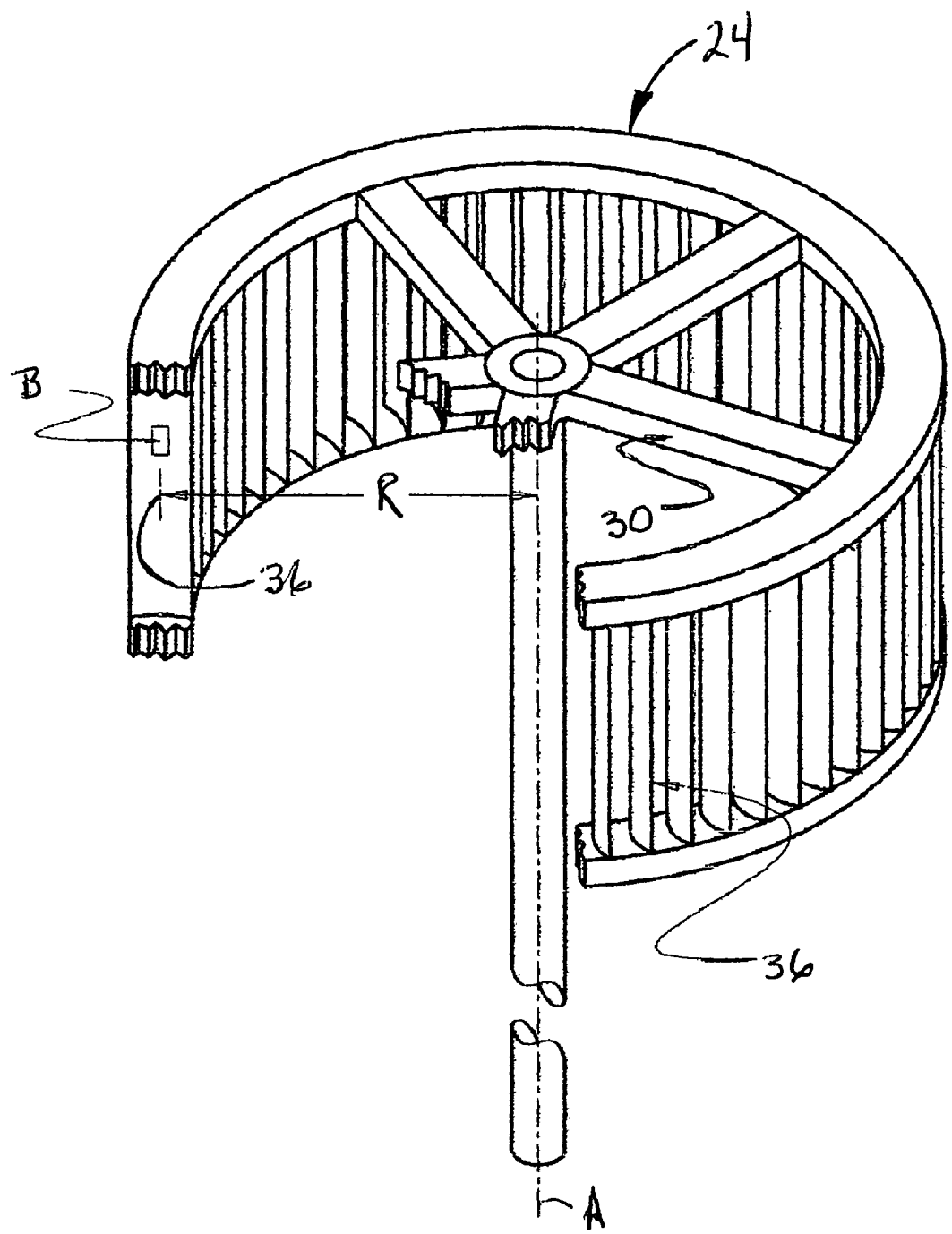
FIG. 6 is a schematic perspective view of the second embodiment with parts broken away.

As shown in FIG. 1, a housing 40 surrounds drum 24 and horizontal shutters 42 or vertical shutters 44 provided to control the number of vanes 36 exposed to the wind. Mechanical motors (not shown) are provided to rotate/slide shutters between open, partially open and closed positions. This is an alternate way to mask the down-wind turbine blades 36 from the wind to minimize resistance to rotation as well as protect the assembly 22 from inclement weather. Shutters 42, 44 can be fully open in low wind conditions, half opened when in moderate winds, and partially opened when wind velocity is high. As seen in FIG. 6, the area B at the center of pressure is positioned at a radial distance R from the axis of rotation A. By optimizing the length of R, the moment arm created thereby provides the maximum torque and, hence, provides the maximum work possible for a given configuration.

Figure 2:
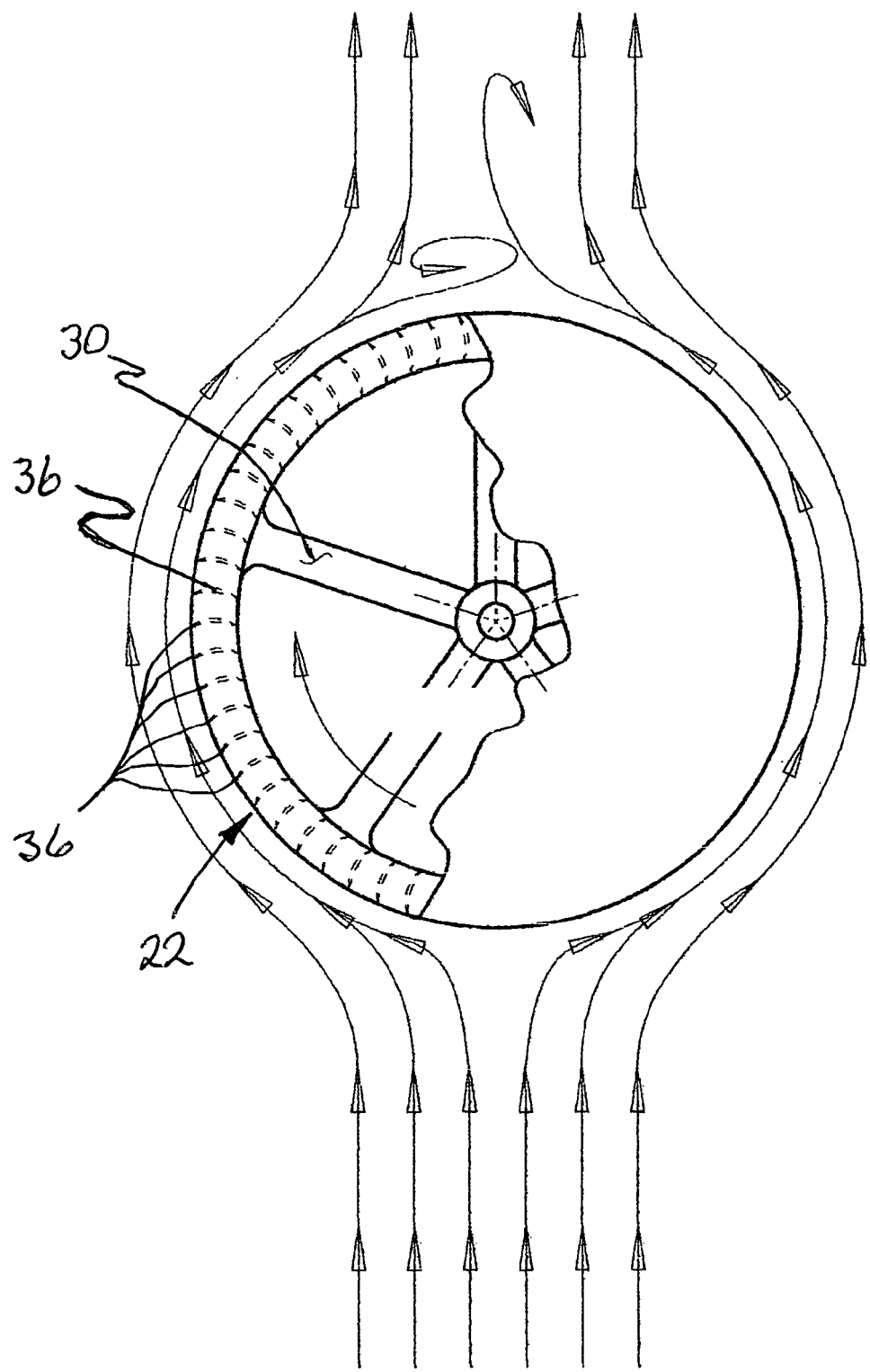
FIG. 2 is a schematic top view of the first embodiment.
Figure 3A:
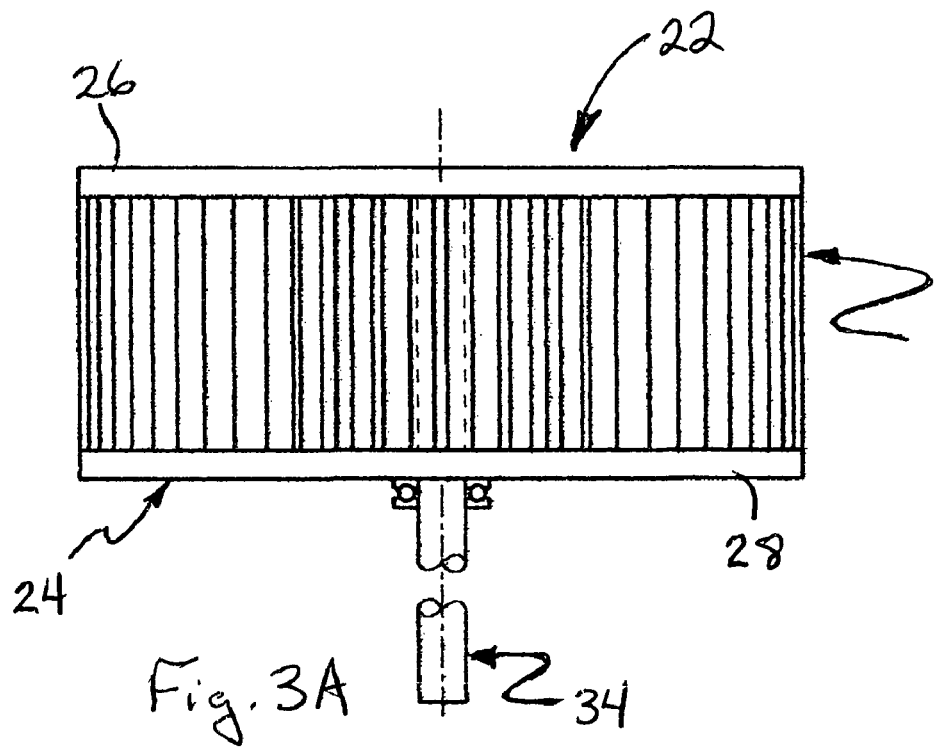
FIG. 3A is a side view of the turbine used in first embodiment.
Figure 3B:
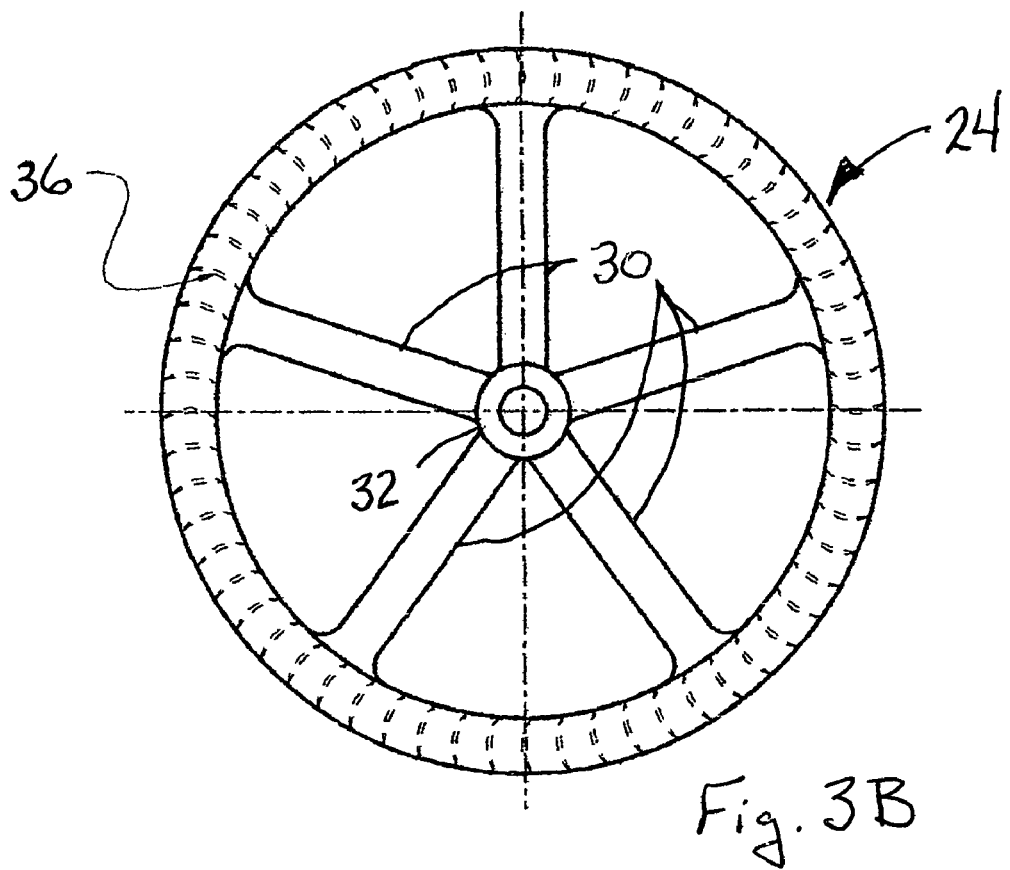
FIG. 3B is a top view of the turbine shown in FIG. 3A.
Figure 4:
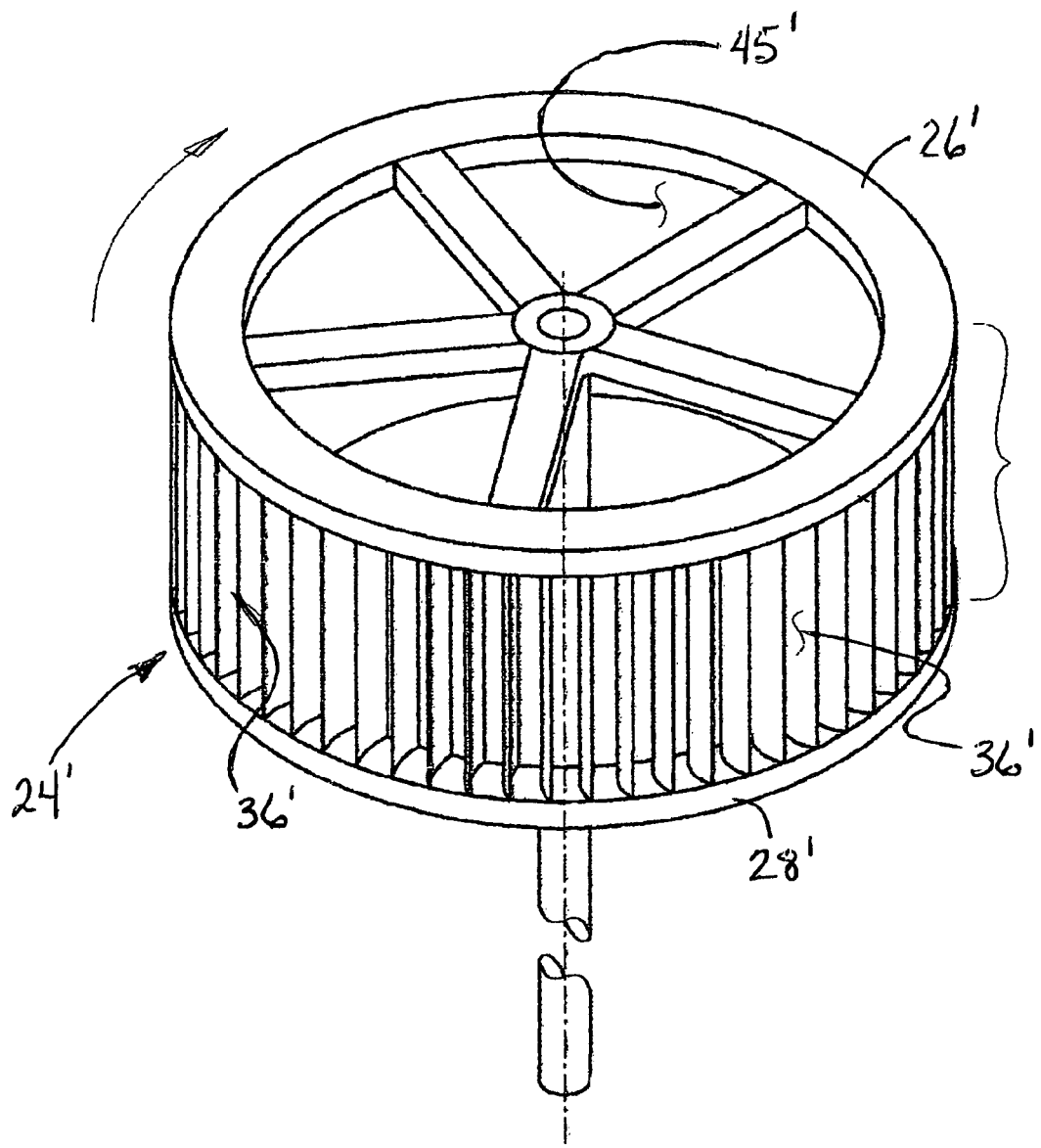
FIG. 4 is a schematic perspective of the first embodiment of the turbine used in the present invention.
Figure 5:
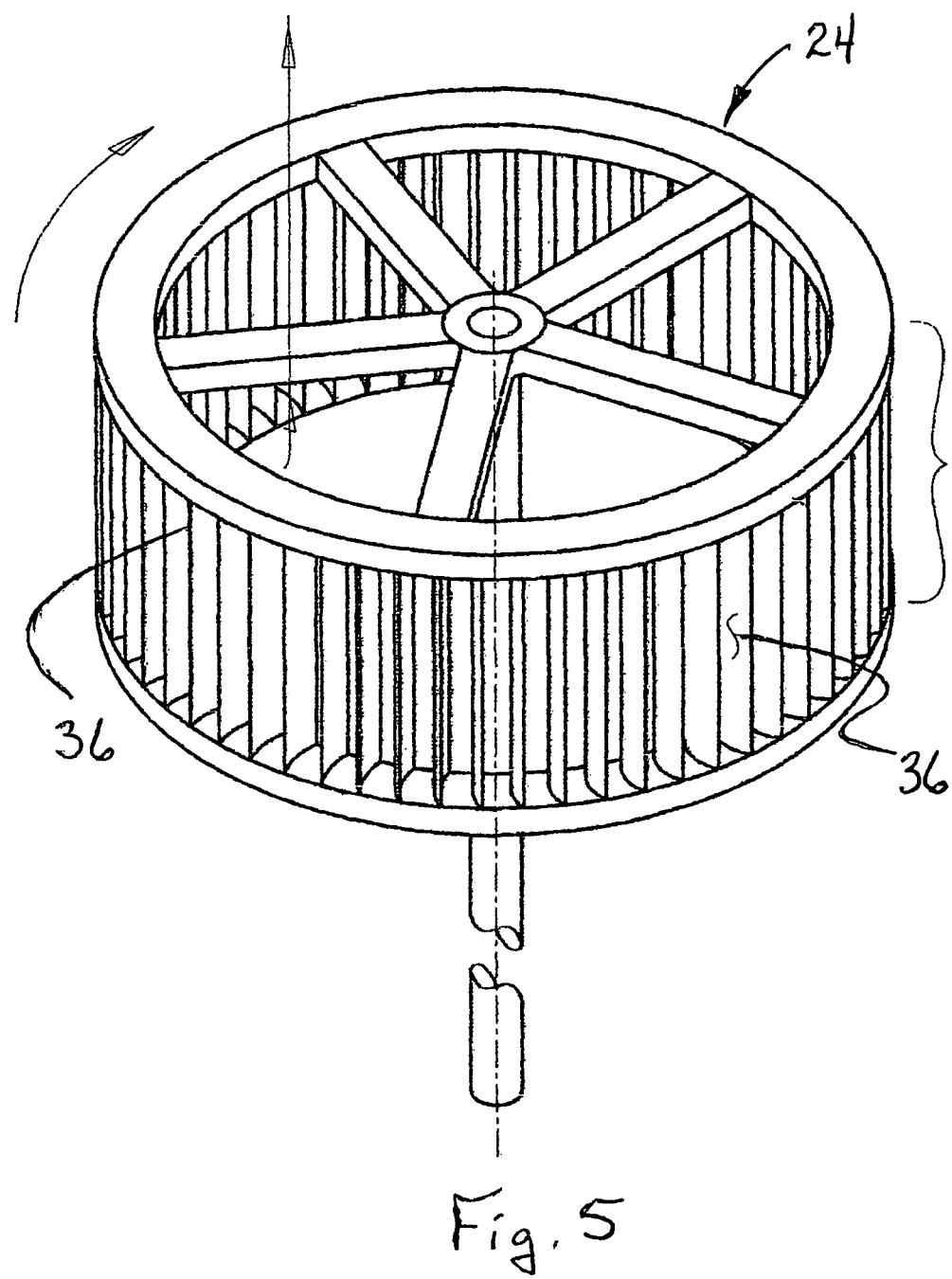
FIG. 5 is a schematic perspective view of a second embodiment of the turbine.

The turbine configuration may be of the open variety as shown in FIGS. 2, 5 or, alternatively, as shown in a second embodiment depicted in FIG. 4, the turbine may be of a closed configuration; that is, an inner housing 45' can be provided extending between rings 26', 28' to prevent wind from passing through the drum 24'. It is believed that the housing 45', while adding some additional weight, will make up for it by focusing the force of the wind on blades 36', rather than allowing some of the wind to slip off the surface of blades 36' into the interior of drum 24'.

Figure 9:
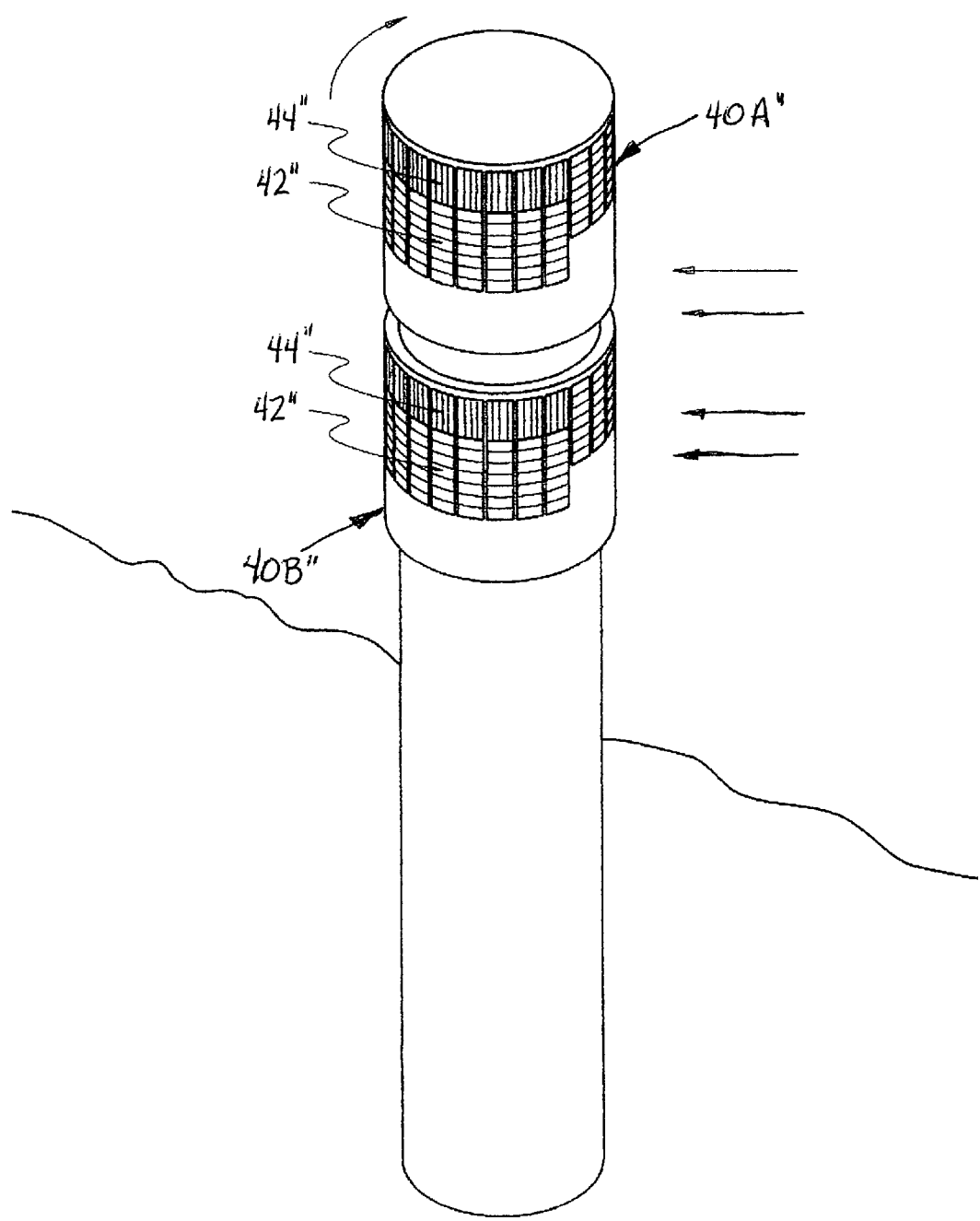
FIG. 9 is a schematic perspective depicting multiple turbines on a single tower.

FIG. 9 shows multiple turbines in multiple housings 40A", 40W' mounted on a single tower 50". While only two are shown, obviously, additional turbines could be utilized. Tower 50" will be sized to position turbine assemblies 22 above buildings, trees, etc., that will interfere with air flow causing wind shear and reducing the effectiveness of the wind turbines.

Figures 10A, 10B:
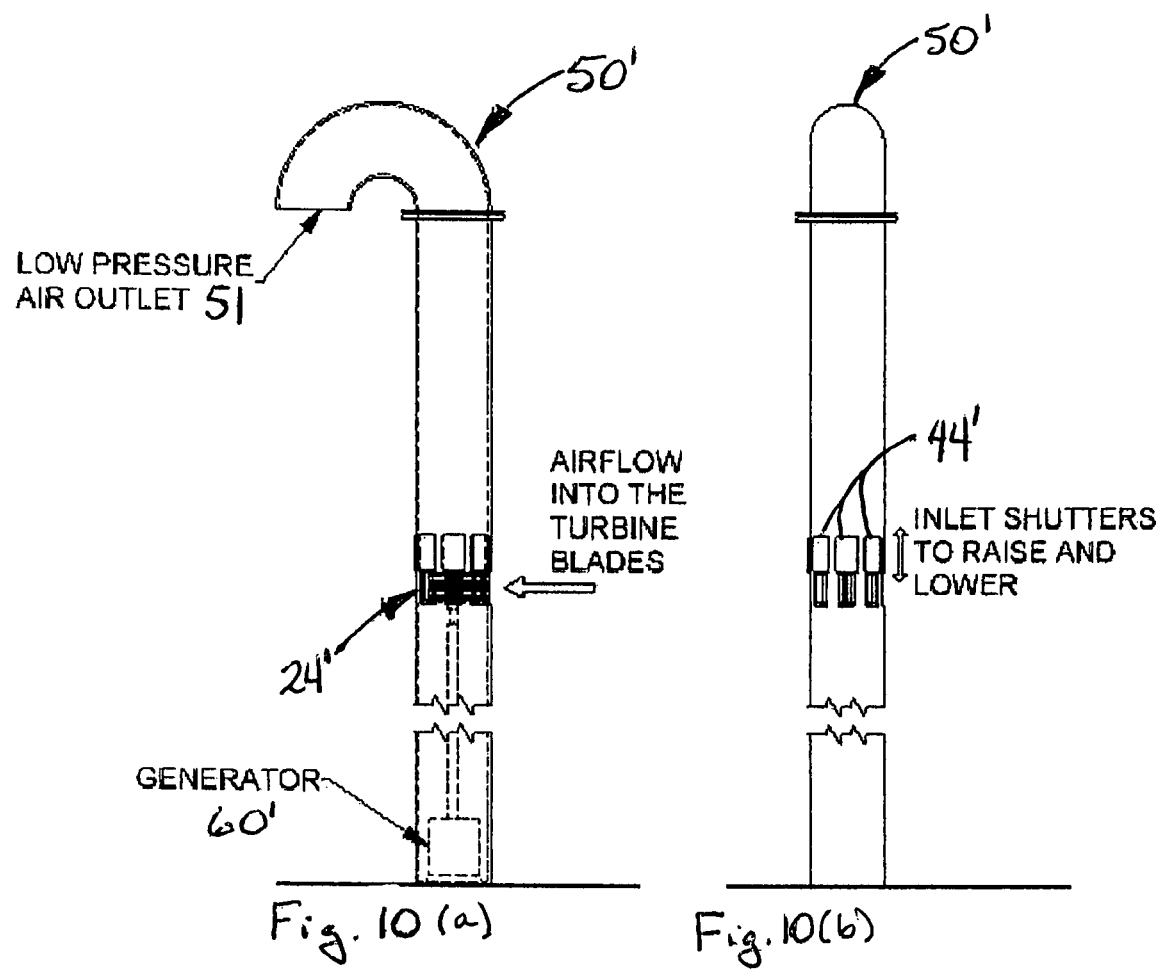

FIGS. 10a and 10b depict an alternative configuration of wind tower 50'. In this embodiment, the tower 50' also forms the function of a housing for drum 24' and generator 60'. Shutters 44' can be slid vertically to open slots 45' there beneath to provide the turbine blades on drum 24' access to the wind. Shutters 44' can be closed to protect turbine assembly 22' from inclement weather. Once the energy from the wind has been extracted by the turbine assembly 22', the low pressure air will be discharged out of outlet 51'.

Figure 12:
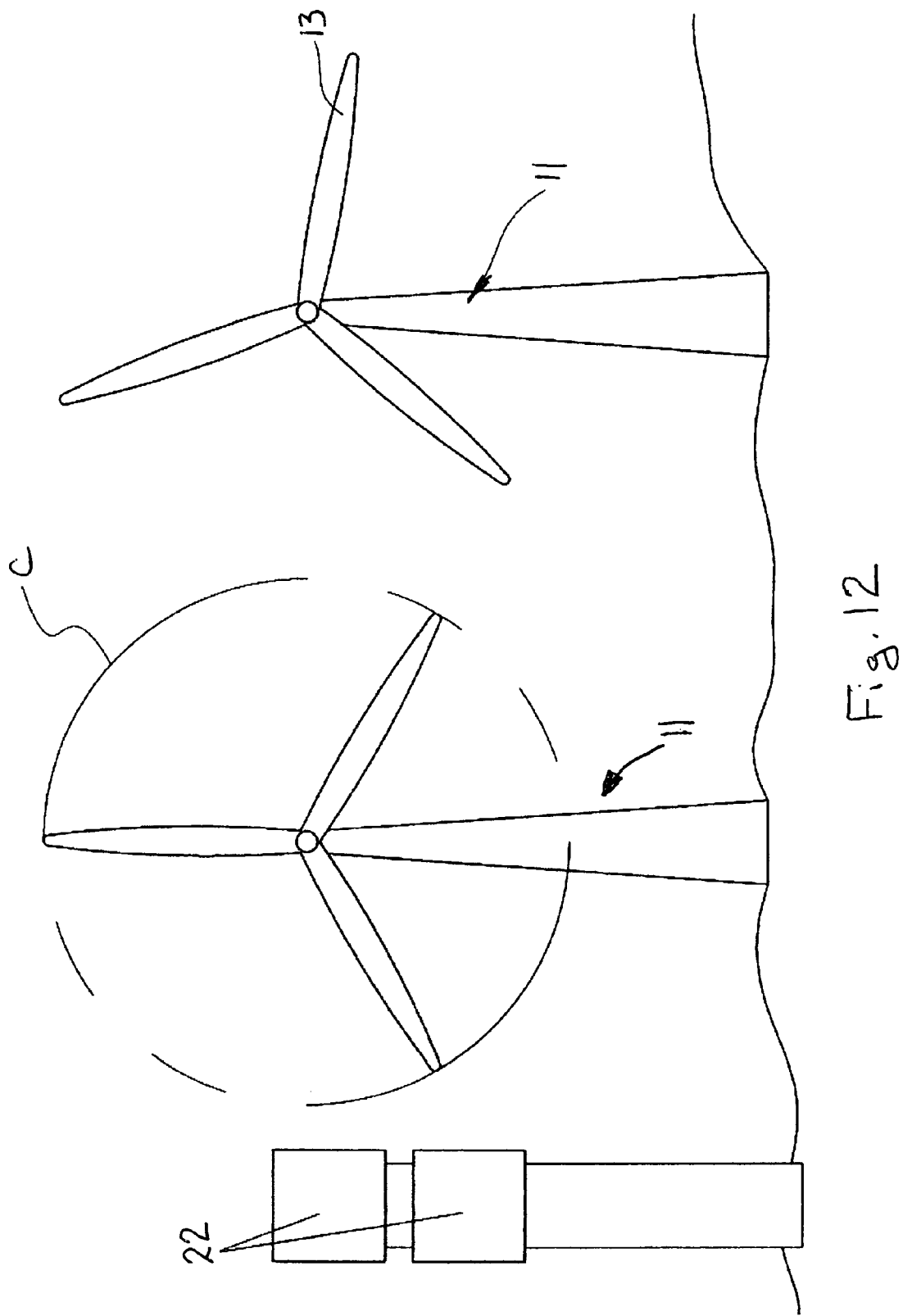
FIG. 12 is a schematic front view depicting the comparative space taken up by two of the turbines of the present invention versus two of the prior art devices.

FIGS. 11a, 11b show the footprint prior art propeller-style wind turbines 11 require. These bird-eaters require hundreds of feet of clearance to enable propeller blades 13 adequate space to pivot around arc C (FIG. 11b). As shown in FIG. 12, by contrast, turbine assembly 22 is far more efficient in its use of space. The foot print of the turbine assembly 22 is not significantly greater than that of the tower 50 itself, unlike the case with the prior art turbines 11. Accordingly, turbine assembly 22 can be positioned aboard a ship 15 (FIG. 13) to provide auxiliary emergency power when other systems fail. In addition, a beefier version of the assembly 22 can be used in marine applications to capture energy generated by relative movement between a piece of machinery or offshore platform 17 and ocean currents D. The turbine assembly 22 can provide energy to a generator which supplies a battery (not shown) or directly powers the machinery.

Various changes, alternatives, and modifications will become apparent to a person of ordinary skill in the art after a reading of the foregoing specification. It is intended that all such changes, alternatives, and modifications as fall within the scope of the appended claims be considered part of the present invention.

I claim:

1. A wind turbine for powering an electrical generator, said wind turbine comprising
   a) a first cylindrical drum member having a first footprint;
   b) a first ring at a first end of said cylindrical drum member;
   c) a second ring at a second opposite end of said cylindrical drum member;
   d) a plurality of turbine vanes extending between said first and second rings and being directly pivotally connected to each of said first and said second rings, each of said plurality of turbine vanes have an arcuate surface for scooping wind, said plurality of turbine vanes being spaced closely enough so as to form a closed surface on said cylindrical drum when pivoted to a closed position to reduce drag;
   e) a centrally located shaft which rotationally mounts said drum member for rotation about its longitudinal axis;
   f) means for mounting said centrally located shaft enabling said cylindrical drum member to rotate about its longitudinal axis, wherein said means for mounting comprises a tower which has a second footprint smaller than said first footprint of said cylindrical drum member, said tower being mounted on a portion of ground and having a height sufficient to elevate said first cylindrical drum member above wind-blocking obstructions.

2. The wind turbine of claim 1 further comprising a second cylindrical drum member mounted on said tower at a position below said first cylindrical drum member, said second cylindrical drum member being identical in structure to said first cylindrical drum member and cooperating therewith to power the electrical generator.

3. The wind turbine of claim 1 wherein said shaft rotationally mounting said cylindrical drum member extends vertically and said cylindrical drum member rotates about a vertical axis.

4. The wind turbine of claim 1 further comprising a housing surrounding said cylindrical drum member, shutter means for exposing said turbine vanes to a wind, said shutter means being movably mounted about a horizontal axis on said housing, and mechanical means to open and close said shutter means.

5. The wind turbine of claim 4 further comprising a low pressure outlet positioned in said housing above said cylindrical drum member.

6. The wind turbine of claim 1 further comprising a cam follower attached to each said vane, said cam follower being in contact with a cam inside said cylindrical drum member, said cam controlling a rotating motion of each said vane.

7. A wind turbine for powering an electrical generator, said wind turbine comprising
   a) a first cylindrical drum member having a first footprint;
   b) a first ring at a first end of said cylindrical drum member;
   c) a second ring at a second opposite end of said cylindrical drum member;
   d) a plurality of turbine vanes extending between said first and second rings and being directly pivotally connected to each of said first and said second rings, each of said plurality of turbine vanes have an arcuate surface for scooping wind, said plurality of turbine vanes being spaced closely enough so as to form a closed surface on said cylindrical drum when pivoted to a closed position to reduce drag;

e) a centrally located shaft which rotationally mounts said drum member for rotation about its longitudinal axis;

f) means for mounting said centrally located shaft enabling said cylindrical drum member to rotate about its longitudinal axis;

wherein said turbine vanes are pivotally mounted to said first and second ring to enable them to maximize a surface exposure to wind facilitating rotation of said cylindrical drum member while minimizing surface exposure to wind opposing that rotation, each said vane having a cam follower attached thereto which contacts a surface of a cam which controls a pivoting motion of each said vane.

8. The wind turbine of claim 7 further comprising a housing surrounding said cylindrical drum member, shutter means for exposing said turbine vanes to a wind, said shutter means being movably mounted about a horizontal axis on said housing, and mechanical means to open and close said shutter means.

9. The wind turbine of claim 8 further comprising a low pressure outlet positioned in said housing above said cylindrical drum member.

10. The wind turbine of claim 9 wherein said low pressure outlet is formed in a downwardly directed portion of said housing.

11. The wind turbine of claim 8 further comprising mounting means securing said first cylindrical drum member on board a ship to provide backup electrical power for emergency use.

12. The wind turbine of claim 8 further comprising a low pressure outlet positioned in said housing above said cylindrical drum member.

13. The wind turbine of claim 12 wherein said low pressure outlet is formed in a downwardly directed portion of said housing.

14. The wind turbine of claim 7 wherein said means for mounting comprises a tower which has a second footprint smaller than said first footprint of said cylindrical drum member, said tower being mounted on a portion of ground and having a height sufficient to elevate said first cylindrical drum member above wind-blocking obstructions.

15. The wind turbine of claim 14 further comprising a second cylindrical drum member mounted on said tower at a position below said first cylindrical drum member, said second cylindrical drum member being identical in structure to said first cylindrical drum member and cooperating therewith to power the electrical generator.

16. The wind turbine of claim 7 wherein said shaft rotationally mounting said cylindrical drum member extends vertically and said cylindrical drum member rotates about a vertical axis.

17. A wind turbine for powering an electrical generator, said wind turbine comprising a) a first cylindrical drum member having a first footprint;

b) a first ring at a first end of said cylindrical drum member;

c) a second ring at a second opposite end of said cylindrical drum member;

d) a plurality of turbine vanes extending between said first and second rings and being directly pivotally connected to each of said first and said second rings, each of said plurality of turbine vanes have an arcuate surface for scooping wind, said plurality of turbine vanes being spaced closely enough so as to form a closed surface on said cylindrical drum when pivoted to a closed position to reduce drag;

e) a centrally located shaft which rotationally mounts said drum member for rotation about its longitudinal axis;

f) means for mounting said centrally located shaft enabling said cylindrical drum member to rotate about its longitudinal axis;

g) a housing surrounding said cylindrical drum member, shutter means for exposing said turbine vanes to a wind, said shutter means being movably mounted to move in a vertical direction on said housing, and mechanical means to open and close said shutter means.

18. The wind turbine of claim 17 wherein said means for mounting comprises a tower which has a second footprint smaller than said first footprint of said cylindrical drum member, said tower being mounted on a portion of ground and having a height sufficient to elevate said first cylindrical drum member above wind-blocking obstructions.

19. The wind turbine of claim 17 further comprising a low pressure outlet formed in a downwardly directed portion of said housing.

\* \* \* \* \*